United States Patent
Shinzaki et al.

(10) Patent No.: US 11,972,602 B2
(45) Date of Patent: Apr. 30, 2024

(54) OBJECT RECOGNITION DEVICE, OBJECT RECOGNITION SYSTEM, AND OBJECT RECOGNITION METHOD

(71) Applicant: PANASONIC INTELLECTUAL PROPERTY MANAGEMENT CO., LTD., Osaka (JP)

(72) Inventors: Makoto Shinzaki, Kanagawa (JP); Yuichi Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 233 days.

(21) Appl. No.: 17/763,752

(22) PCT Filed: Sep. 10, 2020

(86) PCT No.: PCT/JP2020/034288
§ 371 (c)(1),
(2) Date: Mar. 25, 2022

(87) PCT Pub. No.: WO2021/065413
PCT Pub. Date: Apr. 8, 2021

(65) Prior Publication Data
US 2022/0343635 A1 Oct. 27, 2022

(30) Foreign Application Priority Data
Sep. 30, 2019 (JP) ................. 2019-179767

(51) Int. Cl.
*G06V 10/00* (2022.01)
*G06V 10/26* (2022.01)
(Continued)

(52) U.S. Cl.
CPC ........ *G06V 10/7747* (2022.01); *G06V 10/273* (2022.01); *G06V 10/778* (2022.01)

(58) Field of Classification Search
CPC .......... G06N 3/08; G06N 3/082; G06N 3/088; G06N 3/09; G06N 3/091; G06N 3/092;
(Continued)

(56) References Cited

U.S. PATENT DOCUMENTS 9,959,628 B2 * 5/2018 Mutti ................... G06V 10/811
10,395,114 B1 * 8/2019 Freeston ................ G06N 20/00
(Continued)

FOREIGN PATENT DOCUMENTS

| JP | 6275362 | 2/2018 |
| JP | 2019-101740 | 6/2019 |
| WO | 2019/113510 A1 | 6/2019 |

OTHER PUBLICATIONS

Lee Myeong Ho, "KR102022559B1 Method and computer program for photographing image without background and taking composite photograph using digital dual-camera"; filing May 23, 2019.*
(Continued)

*Primary Examiner* — Amir Alavi
(74) *Attorney, Agent, or Firm* — GREENBLUM & BERNSTEIN, P.L.C.

(57) ABSTRACT

Provided is a method for performing accurate object recognition in a stable manner in consideration of changes in a shooting environment. In such a method, a camera captures an image of a shooting location where an object is to be placed and an object included in an image of the shooting location is recognized utilizing a machine learning model for object recognition. The method further involves: determining necessity of an update operation on the machine learning model for object recognition at a predetermined time; when the update operation is necessary, causing the camera to capture an image of the shooting location where no object is placed to thereby re-acquire a background image for training; and causing the machine learning model to be trained
(Continued)

using a composite image of a backgroundless object image and the re-acquired background image for training as training data.

12 Claims, 10 Drawing Sheets

(51) Int. Cl.
*G06V 10/774* (2022.01)
*G06V 10/778* (2022.01)

(58) Field of Classification Search
CPC ........ G06N 3/094; G06N 3/096; G06N 3/098; G06N 20/00; G06V 10/7747; G06V 10/778; G06V 10/273; G06V 20/52; G07G 1/0045; G07G 1/0063; G07G 1/12; G07G 1/14; G06Q 20/208
See application file for complete search history.

(56) References Cited

U.S. PATENT DOCUMENTS

| | | | | |
|---|---|---|---|---|
| 10,467,454 B2* | 11/2019 | Srivastava | ........... | G07G 1/0063 |
| 10,572,757 B2* | 2/2020 | Graham | ................ | G06F 18/40 |
| 10,867,214 B2* | 12/2020 | Tremblay | ................ | G06N 3/08 |
| 10,977,818 B2* | 4/2021 | Clark | ........................ | G06T 7/77 |
| 11,087,172 B2* | 8/2021 | Lwowski | ............. | G06V 10/776 |
| 11,776,247 B2* | 10/2023 | Bowman | ............. | G06V 10/955 |
| | | | | 382/104 |
| 11,805,328 B2* | 10/2023 | Duran | .................... | H04N 23/71 |
| 11,869,236 B1* | 1/2024 | Callari | ................ | G06F 16/583 |
| 2018/0308281 A1 | 10/2018 | Okoyama | | |
| 2019/0095069 A1* | 3/2019 | Proctor | ................... | G06F 3/011 |
| 2022/0343635 A1* | 10/2022 | Shinzaki | ............. | G06Q 20/208 |

OTHER PUBLICATIONS

Extended European Search Report dated Sep. 13, 2022 issued in European patent application No. 20872838.6.
R. Sukthankar et al: "Argus: the digital doorman", IEEE Intelligent Systems, vol. 16, No. 2, Mar. 1, 2001 (Mar. 1, 2001), pp. 14-19, XP055020718, ISSN: 1541-1672, DOI: 10.1109/5254.920593.
Georgios Georgakis et al: "Synthesizing Training Data for Object Detection in Indoor Scenes", Arxiv.org, Cornell University Library, 201 Olin Library Cornell University Ithaca, NY 14853, Feb. 25, 2017 (Feb. 25, 2017), XP080748552, DOI: 10.15607/RSS.2017. XIII.043.
International Search Report issued in International Pat. Appl. No. PCT/JP2020/034288, dated Nov. 24, 2020, along with an English translation thereof.

* cited by examiner

*Fig.8*

| user detection | item detection | state | update necessity determ |
|---|---|---|---|
| detected | item detected | normal | unnecessary |
| not detected | no item | | |
| detected | no item | unrecognition | necessary if freq exceed threshold |
| not detected | item detected | misrecognition | |

*Fig.9*

| item recognition | correction OP | state | update necessity determ |
|---|---|---|---|
| no item | not done | normal | unnecessary |
| item recognized | not done | normal | unnecessary |
| no item | done | unrecognition | necessary if freq exceed threshold |
| item recognized | done | misrecognition | necessary if freq exceed threshold |

*Fig.10*
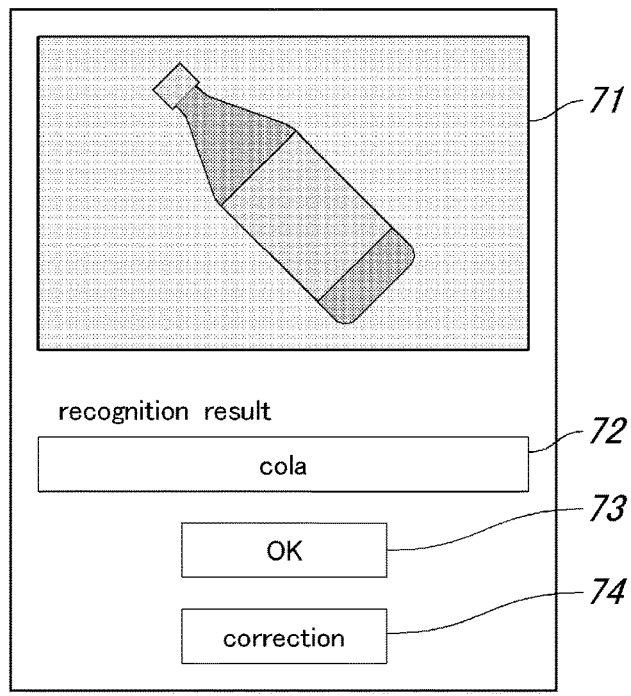
(A)
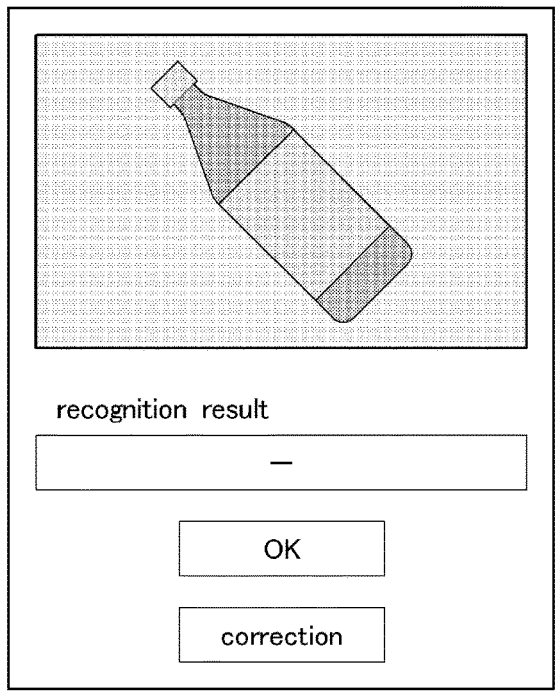
(B)
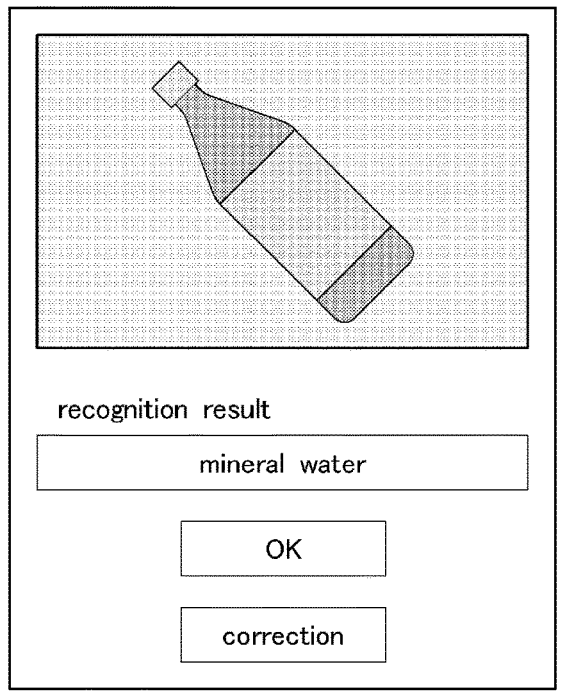
(C)

OBJECT RECOGNITION DEVICE, OBJECT RECOGNITION SYSTEM, AND OBJECT RECOGNITION METHOD

TECHNICAL FIELD

The present disclosure relates to an object recognition device, an object recognition system, and an object recognition method for recognizing an object utilizing a machine learning model.

BACKGROUND ART

Recently, in the field of object recognition technologies for recognizing an object from an image captured by a camera, machine learning models (e.g., those created by deep learning technology) have been utilized to achieve dramatically improved object recognition accuracy. Use of such object recognition technologies allows for the introduction of self-checkout systems (unmanned checkout systems) at a retail store, which systems enable users (shoppers) to check out merchandise items to be purchased without store staff. As a result, it becomes possible to reduce personnel costs at stores and also reduce time required for checkout, thereby improving customers' convenience.

Known object recognition technologies utilizing machine learning models include a method of creating a machine learning model for object recognition, comprising: combining a virtual object image generated by using computer graphics (CG) technology with a background image to generate a composite image for training; and then creating a machine learning model trained with the generated composite image, by using deep learning technology (Patent Document 1).

PRIOR ART DOCUMENT(S)

Patent Document(s)

Patent Document 1: JP6275362B

SUMMARY OF THE INVENTION

Task to be Accomplished by the Invention

In order to enable such a self-checkout device to identify a merchandise item purchased by a user through object recognition to thereby check out the merchandise item, the user needs to place the merchandise item on a shooting platform so that a camera can capture an image of the merchandise item. When there is a significant change in an environment of the device (e.g., a change in the sunlight condition), the brightness of the shooting platform can greatly change, leading to a significant change in the brightness of a background area in a captured image of a merchandise item. As a result, a captured image of an object to be identified becomes quite different from the image of the same object used for training a machine learning model, leading to a decrease in the object recognition accuracy.

The above-described technology of the prior art enables images for training in various situations to be easily acquired since a composite image for training is generated by combining a virtual object image generated by using CG technology with a background image. Thus, it is possible to construct a machine learning model that is less affected by environmental changes. However, as an actual environment of the device is changed due to various factors, there is a limit on generation of virtual images for training by using CG technology. Thus, there is a need to acquire images for training from actual images captured by a camera and train a machine learning model with the acquired images.

The present disclosure has been made in view of the problem of the prior art, and a primary object of the present disclosure is to provide an object recognition device, an object recognition system, and an object recognition method for performing accurate object recognition in a stable manner in consideration of changes in a shooting environment.

Means to Accomplish the Task

An aspect of the present invention provides an object recognition device comprising: a camera configured to capture an image of a shooting location where an object is to be placed; and a processor configured to recognize an object included in an image of the shooting location, utilizing a machine learning model for object recognition; wherein the machine learning model for object recognition is constructed based on trained model data generated by a training operation using a composite image of a backgroundless object image and a background image for training acquired by capturing an image of the shooting location where no object is placed, and wherein the processor is configured to: determine necessity of an update operation on the machine learning model for object recognition at a predetermined time; when determining that the update operation is necessary, cause the camera to capture an image of the shooting location where no object is placed to thereby re-acquire a background image for training; and cause the machine learning model to be trained using a composite image of a backgroundless object image and the re-acquired background image for training as training data.

Another aspect of the present invention provides an object recognition system comprising a shooting location where an object is to be placed, and a camera for capturing an image of the shooting location and configured to recognize an object included in an image of the shooting location, utilizing a machine learning model for object recognition, wherein the machine learning model for object recognition is constructed based on trained model data generated by a training operation using a composite image of a backgroundless object image and a background image for training acquired by capturing an image of the shooting location where no object is placed, and wherein the object recognition system is configured to: determine necessity of an update operation on the machine learning model for object recognition at a predetermined time; when determining that the update operation is necessary, cause the camera to capture an image of the shooting location where no object is placed to thereby re-acquire a background image for training; and cause the machine learning model to be trained using a composite image of a backgroundless object image and the re-acquired background image for training as training data.

Yet another aspect of the present invention provides an object recognition method comprising: capturing an image of a shooting location where an object is to be placed with a camera; and recognizing an object included in an image of the shooting location, utilizing a machine learning model for object recognition, wherein the object recognition method further comprises: determining necessity of an update operation on the machine learning model for object recognition at a predetermined time; when the update operation is necessary, causing the camera to capture an image of the shooting location where no object is placed to thereby re-acquire a background image for training; and causing the machine learning model to be trained using a composite image of a backgroundless object image and the re-acquired background image for training as training data.

Effect of the Invention

According to the present disclosure, a machine learning model for object recognition is updated such that, even when there is a significant change in an environment, an object recognition operation is carried out by using a machine learning model adapted for a new environment. As a result, it is possible to perform accurate object recognition in a stable manner in consideration of changes in a shooting environment.

BRIEF DESCRIPTION OF THE DRAWINGS

FIG. 8 is an explanatory diagram showing an outline of determination of necessity of an update operation performed by a merchandise item checkout system according to a third embodiment of the present disclosure;

FIG. 9 is an explanatory diagram showing an outline of determination of necessity of an update operation performed by a merchandise item checkout system according to a variant of the third embodiment; and FIG. 10 is an explanatory diagram showing a screen displayed on a display 14 of a merchandise item checkout device 1 according to the variant of the third embodiment.

DESCRIPTION OF THE PREFERRED EMBODIMENT(S)

Figure 1:
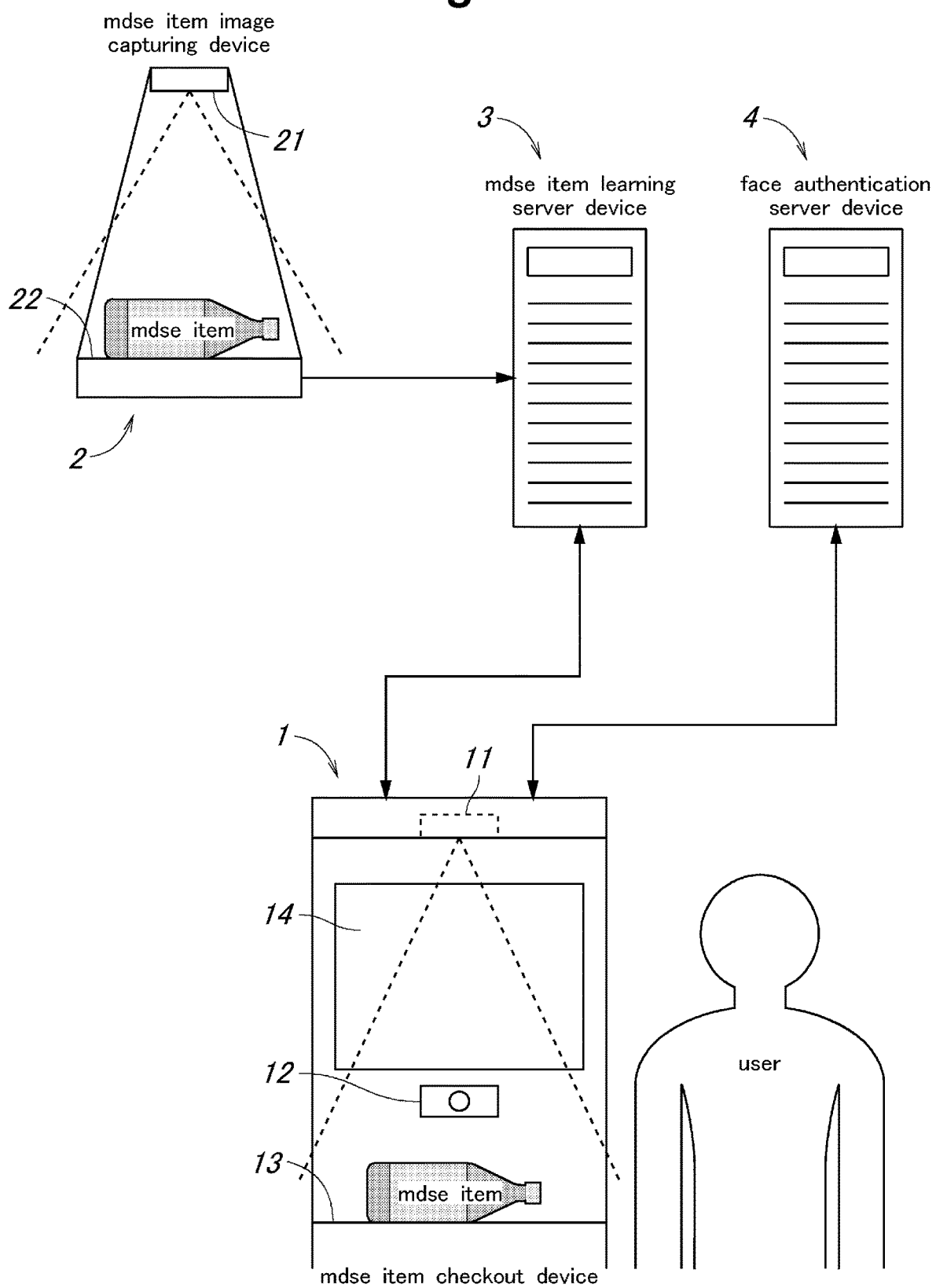
FIG. 1 is a diagram showing a general configuration of a merchandise item checkout system according to a first embodiment of the present invention.

A first aspect of the present invention made to achieve the above-described object is an object recognition device comprising: a camera configured to capture an image of a shooting location where an object is to be placed; and a processor configured to recognize an object included in an image of the shooting location, utilizing a machine learning model for object recognition; wherein the machine learning model for object recognition is constructed based on trained model data generated by a training operation using a composite image of a backgroundless object image and a background image for training acquired by capturing an image of the shooting location where no object is placed, and wherein the processor is configured to: determine necessity of an update operation on the machine learning model for object recognition at a predetermined time; when determining that the update operation is necessary, cause the camera to capture an image of the shooting location where no object is placed to thereby re-acquire a background image for training; and cause the machine learning model to be trained using a composite image of a backgroundless object image and the re-acquired background image for training as training data.

In this configuration, a machine learning model for object recognition is updated such that, even when there is a significant change in an environment, an object recognition operation is carried out by using a machine learning model adapted for a new environment. As a result, it is possible to perform accurate object recognition in a stable manner in consideration of changes in a shooting environment.

A second aspect of the present invention is the object recognition device of the first aspect, wherein the camera captures a current image of the shooting location where no object is placed, to thereby acquire a background image for determination, and wherein the processor determines that the update operation is necessary when the background image for determination is different from the background image for training to an amount equal to or greater than a predetermined level.

When the background image for determination (a current background image) is significantly different from the background image for training (background image at the time of training), the object recognition accuracy is likely to be reduced. Thus, this configuration enables the object recognition device to properly determine the necessity of the update operation.

A third aspect of the present invention is the object recognition device of the second aspect, wherein machine learning models for object recognition are created for a plurality of times of day, and wherein the processor determines which of the machine learning models for object recognition needs to be used in the update operation based on the time of day when the background image for determination is different from the background image for training to an amount equal to or greater than the predetermined level.

In this configuration, since a machine learning model for object recognition is generated for each time of day and updated in consideration of changes in a shooting environment, the device can achieve proper object recognition.

A fourth aspect of the present invention is the object recognition device of the second aspect, wherein machine learning models for object recognition are created for a plurality of types of weather conditions, and wherein the processor determines which of the machine learning models for object recognition needs to be used in the update operation based on the weather condition at a time when the background image for determination is different from the background image for training to an amount equal to or greater than the predetermined level.

In this configuration, since a machine learning model for object recognition is generated for each type of weather condition and is updated as appropriated in consideration of changes in a shooting environment, the device can achieve proper object recognition.

A fifth aspect of the present invention is the object recognition device of the first aspect, wherein the processor determines that the update operation is necessary when at least one of a current installation position and a current orientation of the object recognition device is different from that at the time of the training operation, to an amount equal to or greater than a predetermined level.

When the location of the device is significantly changed, the brightness of a background area of an image of an object to be recognized can be greatly changed and the object recognition accuracy is likely to be reduced. Thus, this configuration enables the object recognition device to properly determine the necessity of the update operation. A sixth aspect of the present invention is the object recognition device of the first aspect, wherein the processor determines that the update operation is necessary based on a number of times which inconsistency is detected between a result of detection of a user of the object recognition device and a result of detection of an object placed at the shooting location.

When inconsistency frequently occurs between a result of detection of a user of the device and a result of detection of an object placed at the shooting location, the object recognition accuracy is likely to be reduced. Thus, this configuration enables the object recognition device to properly determine the necessity of the update operation.

A seventh aspect of the present invention is the object recognition device of the sixth aspect, the object recognition device of the sixth aspect, wherein the processor determines that there is inconsistency between a result of detection of the user and a result of detection of the object when the user is not detected and the object is detected.

In this configuration, when the object recognition accuracy is likely to be reduced, the object recognition device can properly determine that the update operation is necessary.

An eighth aspect of the present invention is the object recognition device of the sixth aspect, wherein the processor determines that there is inconsistency between a result of detection of the user and a result of detection of the object when the user is detected and the object is not detected.

In this configuration, when the object recognition accuracy is likely to be reduced, the object recognition device can properly determine that the update operation is necessary.

A ninth aspect of the present invention is the object recognition device of the first aspect, wherein the processor determines that the update operation is necessary based on a number of times which a user operates to correct an error in a result of an object recognition operation.

In this configuration, when a user frequently operates to correct an error in a result of an object recognition operation, the object recognition accuracy is likely to be reduced. And, the object recognition device can properly determine the necessity of the update operation.

A tenth aspect of the present invention is the object recognition device of the first aspect, wherein the trained model data is generated by a learning device which holds the backgroundless object image, wherein the object recognition device further comprises a communication device configured to transmit the background image for training to the learning device and receive the trained model data from the learning device, and wherein, when the update operation is necessary, the processor causes the communication device to transmit the background image for training to the learning device, thereby causing the learning device to re-perform the training operation.

In this configuration, the learning device perform the training operation on a machine learning model, which can reduce the processing load imposed on the object recognition device.

An eleventh aspect of the present invention is the object recognition device of the first aspect, wherein the object recognition device is a checkout device for checking out an object placed at the shooting location.

This configuration allows accurate checkout of merchandise items sold at a store.

A twelfth aspect of the present invention is an object recognition system comprising a shooting location where an object is to be placed, and a camera for capturing an image of the shooting location and configured to recognize an object included in an image of the shooting location, utilizing a machine learning model for object recognition, wherein the machine learning model for object recognition is constructed based on trained model data generated by a training operation using a composite image of a backgroundless object image and a background image for training acquired by capturing an image of the shooting location where no object is placed, and wherein the object recognition system is configured to: determine necessity of an update operation on the machine learning model for object recognition at a predetermined time; when determining that the update operation is necessary, cause the camera to capture an image of the shooting location where no object is placed to thereby re-acquire a background image for training; and cause the machine learning model to be trained using a composite image of a backgroundless object image and the re-acquired background image for training as training data.

In this configuration, it is possible to perform accurate object recognition in a stable manner in consideration of changes in a shooting environment in the same manner as the first aspect.

A thirteenth aspect of the present invention is an object recognition method comprising: capturing an image of a shooting location where an object is to be placed with a camera; and recognizing an object included in an image of the shooting location, utilizing a machine learning model for object recognition, wherein the object recognition method further comprises: determining necessity of an update operation on the machine learning model for object recognition at a predetermined time; when the update operation is necessary, causing the camera to capture an image of the shooting location where no object is placed to thereby re-acquire a background image for training; and causing the machine learning model to be trained using a composite image of a backgroundless object image and the re-acquired background image for training as training data.

In this configuration, it is possible to perform accurate object recognition in a stable manner in consideration of changes in a shooting environment in the same manner as the first aspect.

Embodiments of the present invention will be described below with reference to the drawings.

First Embodiment

FIG. 1 is a diagram showing a general configuration of a merchandise item checkout system according to a first embodiment of the present invention.

This merchandise item checkout system enables users (shoppers) who are to purchase merchandise items at a retail store such as a convenience store or a supermarket to check out the merchandise items without store staff, and includes a merchandise item checkout device 1 (object recognition device), a merchandise item image capturing device 2, a merchandise item learning server device 3 (learning device), and a face authentication server device 4.

The merchandise item checkout device 1 uses a machine learning model for merchandise item recognition to identify merchandise items from captured merchandise item images through image recognition (merchandise item recognition operation), and calculates a total amount of payment based on the price (unit price) and quantity of each merchandise item (checkout operation).

This merchandise item checkout device 1 includes a shooting platform 13 (shooting location) where a merchandise item (object) to be purchased by a user is placed, and a merchandise item recognition camera 11 for shooting a merchandise item placed on the shooting platform 13 and, a display 14 for displaying a result of the merchandise item recognition. In addition, the merchandise item checkout device 1 is connected to the merchandise item learning server device 3 via a network. The merchandise item checkout device 1 receives training results; that is, trained model data (such as configuration parameters) related to a trained machine learning model for merchandise item recognition, from the merchandise item learning server device 3, and constructs a machine learning model for merchandise item recognition. When performing merchandise item recognition, the merchandise item checkout device 1 inputs an image captured by the merchandise item recognition camera 11 into the machine learning model for merchandise item recognition, and acquires merchandise item identification information (such as the name of a merchandise item) output from the machine learning model for merchandise item recognition.

The merchandise item checkout device 1 performs operations related to face authentication for checking out (payment for) merchandise items to be purchased by a user. The merchandise item checkout device 1 includes a face authentication camera 12 for capturing the face of a user who is to make a payment for merchandise items. The merchandise item checkout device 1 is connected to the face authentication server device 4 via a network. The merchandise item checkout device 1 transmits a face authentication request including a face image of a target person acquired by the face authentication camera 12 to the face authentication server device 4, and receives a face authentication result from the face authentication server device 4.

The merchandise item image capturing device 2 includes a shooting platform 22 on which a target merchandise item (i.e., a merchandise item sold in a store) is placed, a camera 21 for capturing the merchandise item placed on the shooting platform 22. The merchandise item image capturing device 2 is connected to the merchandise item learning server device 3 via a network. The merchandise item image capturing device 2 captures a merchandise item placed on the shooting platform 22, and also captures the shooting platform 22 without any merchandise item thereon, and transmits captured images to the merchandise item learning server device 3.

The merchandise item learning server device 3 uses captured images acquired from the merchandise item image capturing device 2 to train a machine learning model for merchandise item recognition (e.g. using deep learning technology), and transmits training results; that is, trained model data (such as configuration parameters) related to the machine learning model, to the merchandise item checkout device 1.

The face authentication server device 4 acquires a face image of a target person from the merchandise item checkout device 1 and performs face authentication by comparing the face image of the target person with face images of registrants (registered users) to determine if the target person is a registrant, and then outputs information including a result of face authentication (success or failure) and, if succeeded, the name of the corresponding registrant, as a face authentication result. A machine learning model for face authentication is used in face authentication, and the face authentication server device 4 inputs the face image of a target person into the machine learning model and acquires a face authentication result output from the machine learning model.

Any other authentication method such as password authentication may be adopted for user authentication.

Although the merchandise item checkout device 1 is a device for an unmanned checkout system (an unmanned store), which enables users to check out (make a payment for) merchandise items without store staff, the device may be used in a manned checkout system as a device for supporting payment and settlement work of a cashier. In other embodiments, the device may be configured as a merchandise item recognition device having only a function related to merchandise item recognition for checkout, or a device for recognizing any object, not limited to merchandise items (object recognition device).

Figure 2:
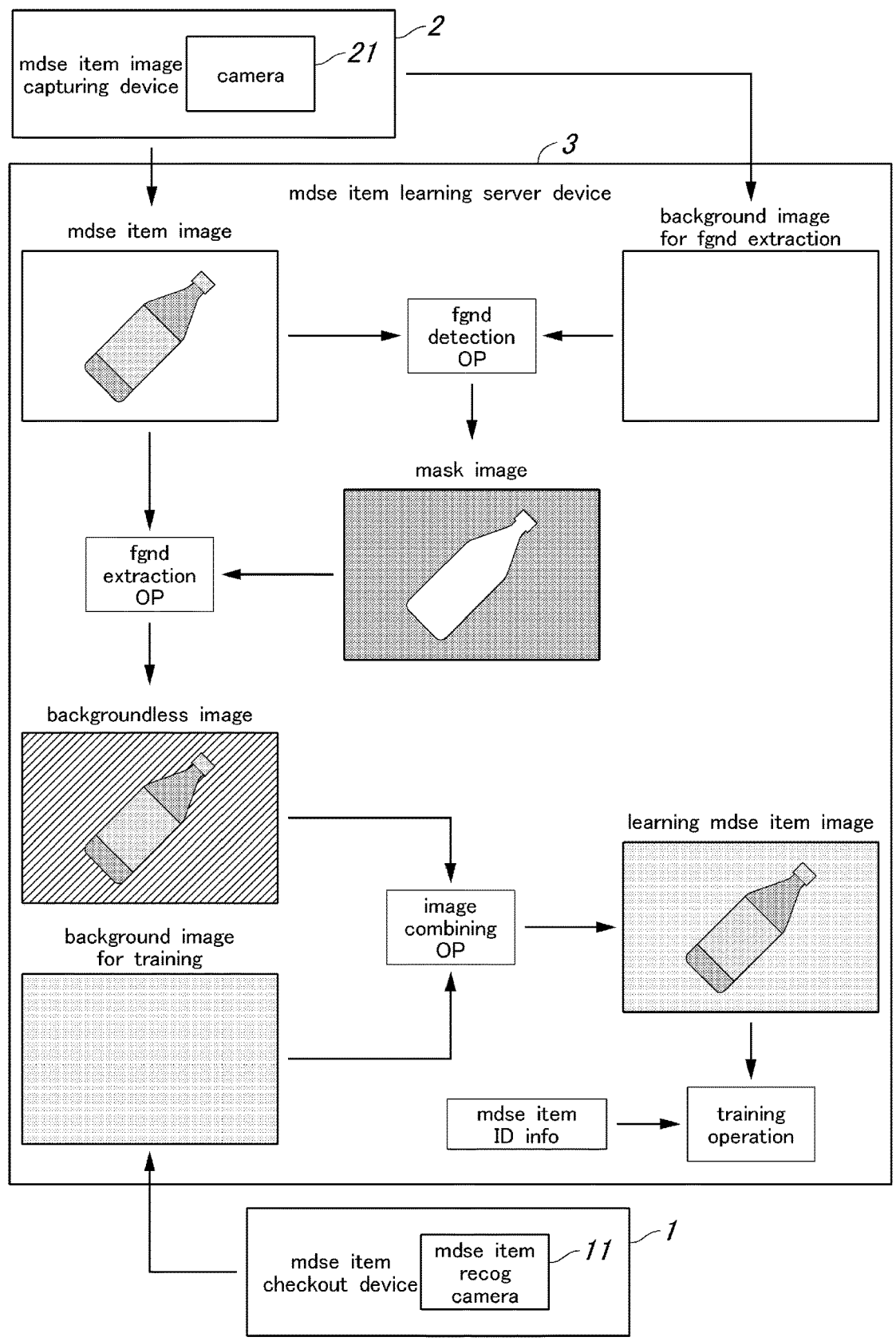
FIG. 2 is an explanatory diagram showing an outline of operations performed by a merchandise item learning server device 3 according to the first embodiment.

Next, operations performed by a merchandise item learning server device 3 according to the first embodiment will be described. FIG. 2 is an explanatory diagram showing an outline of operations performed by a merchandise item learning server device 3.

The merchandise item image capturing device 2 captures an image of a merchandise item to be recognized; that is, a merchandise item sold at the store and placed on the shooting platform 22, and acquires a merchandise item image. The merchandise item image capturing device 2 also captures an image of the shooting platform 22 without any merchandise item thereon and acquires a background image for foreground extraction.

The merchandise item checkout device 1 captures the shooting platform 13 without any merchandise item thereon, with the merchandise item recognition camera 11 to acquire a background image for training, and transmits the background image for training to the merchandise item learning server device 3.

The merchandise item learning server device 3 acquires a merchandise item image and a background image for foreground extraction from the merchandise item image capturing device 2, and detects a foreground area (a merchandise item area) from the merchandise item image based on the merchandise item image and the background image for foreground extraction (foreground detection operation). In this operation, the merchandise item learning server device 3 generates a mask image (an image representing the region of the foreground area) that covers the background area (the area other than the foreground area).

Next, the merchandise item learning server device 3 extracts an image of the foreground area (the merchandise item area) based on a result of the foreground detection operation; that is, based on the mask image, and acquire a backgroundless merchandise item image (backgroundless object image); that is, an image (merchandise item area image) generated by removing the background area from the merchandise item image (foreground extraction operation).

Next, the merchandise item learning server device 3 combines the background image for training (background image of the shooting platform 13 without any merchandise item thereon) with the backgroundless merchandise item image (merchandise item image without the background area) acquired from the merchandise item checkout device 1 to thereby generate a learning merchandise item image (learning object image) representing a merchandise item that is virtually placed on the shooting platform 13 of the checkout device 1 (image combining operation). The image combining operation may be a simple operation in which a backgroundless merchandise item image is overlaid on a background image for training, or a more advanced processing operation such as an operation in which a backgroundless merchandise item image is processed to reproduce a background including shadow by utilizing image analysis results and/or information on the 3D shape of a merchandise item.

Next, the merchandise item learning server device 3 performs a training operation on the machine learning model for merchandise item recognition, using the learning merchandise item image as input training data and the merchandise item identification information as output training data. In this training operation, the merchandise item learning server device 3 acquires trained model data (configuration parameters) related to the trained machine learning model as a training result, and transmits the trained model data to the merchandise item checkout device 1.

In the present embodiment, the merchandise item learning server device 3 performs a training operation on the machine learning model for merchandise item recognition by using a learning merchandise item image showing a merchandise item that is virtually placed on the shooting platform 13 of the checkout device 1, which enables a machine learning model optimized for the merchandise item checkout device 1 to be constructed.

In the present embodiment, the merchandise item image capturing device 2 is used to acquire a merchandise item image, and the merchandise item learning server device 3 detects a foreground area (merchandise item area) from the merchandise item image (foreground detection operation), and extract a backgroundless merchandise item image (merchandise item image without a background) from the merchandise item image (foreground extraction operation). However, when there is merchandise item catalog data or other data which enables backgroundless merchandise item images of all target merchandise items to be acquired, it is not necessary to capture a merchandise item image, and perform a foreground detection operation, and a foreground extraction operation.

Figure 3:
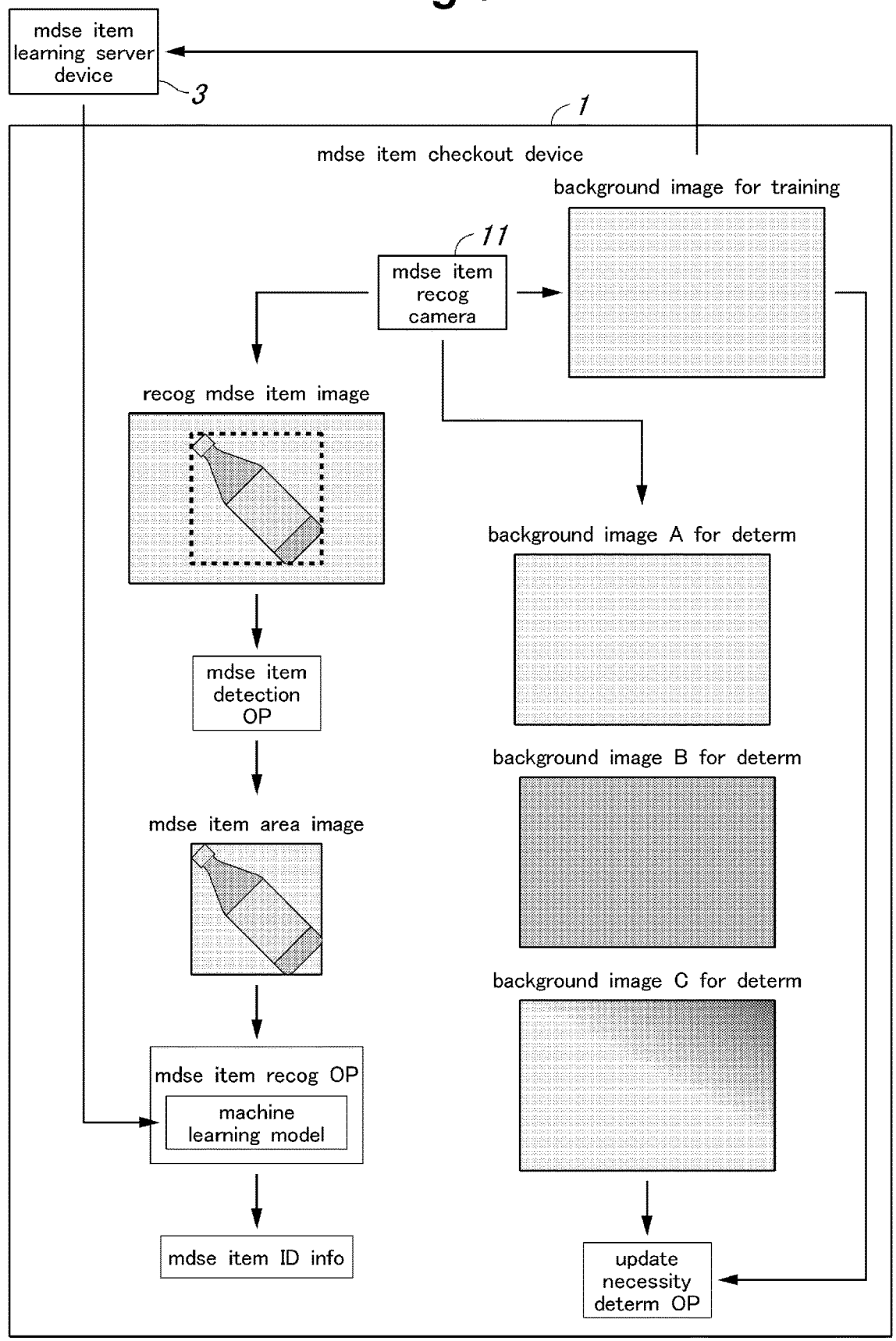
FIG. 3 is an explanatory diagram showing an outline of operations performed by a merchandise item checkout device 1 according to the first embodiment.

Next, operations performed by a merchandise item checkout device 1 according to the first embodiment will be described. FIG. 3 is an explanatory diagram showing an outline of operations performed by a merchandise item checkout device 1.

When receiving from the merchandise item learning server device 3 a training result; that is, trained model data (configuration parameters) related to a trained machine learning model for merchandise item recognition, the merchandise item checkout device 1 constructs a machine learning model for merchandise item recognition based on the trained model data.

Next, the merchandise item checkout device 1 captures an image of a merchandise item placed on the shooting platform 13 with the merchandise item recognition camera 11 and acquires a recognition merchandise item image (object image for recognition). Next, the merchandise item checkout device 1 detects the position of the merchandise item from the recognition merchandise item image and cuts out a rectangular image area surrounding each merchandise item from the recognition merchandise item image, to thereby acquire a merchandise item area image (merchandise item detection operation). Next, the merchandise item checkout device 1 performs the merchandise item recognition operation using a machine learning model for merchandise item recognition. In this operation, the merchandise item checkout device 1 inputs the merchandise item area image into the machine learning model for merchandise item recognition, and acquires merchandise item identification information (the name of a merchandise item) output from the machine learning model for merchandise item recognition (merchandise item recognition operation).

The merchandise item checkout device 1 may prepare a plurality of machine learning models for merchandise item recognition and use a selected one of them depending on the environmental condition.

The merchandise item checkout device 1 can perform the merchandise item detection operation by using a machine learning model in the same manner as the merchandise item recognition operation. In this case, the merchandise item checkout device 1 may construct a machine learning model for merchandise item detection that is different from the machine learning model(s) for merchandise item recognition, and performs the merchandise item detection operation using the machine learning model for merchandise item detection. Alternatively, the merchandise item checkout device 1 may perform the merchandise item detection operation and the merchandise item recognition operation using a common machine learning model(s).

When constructing a machine learning model for merchandise item detection that is different from a machine learning model for merchandise item recognition, the merchandise item checkout device 1 performs an update operation on the machine learning model for merchandise item detection according to changes in the environment in a similar manner to the operation using the machine learning model for merchandise item recognition. Specifically, when the merchandise item checkout device 1 determines that the update operation is necessary, the merchandise item learning server device 3 reproduces a learning merchandise item image from a background image for training captured without any merchandise item thereon, and performs a training operation on a machine learning model for detecting a merchandise item area.

In the present embodiment, the merchandise item checkout device 1 performs the merchandise item recognition operation using a machine learning model for merchandise item recognition, which is constructed by a training operation using a learning merchandise item image generated from a background image for training as training data. However, the brightness of the shooting platform 13 can vary according to the sunlight condition and the weather condition. Thus, when a current brightness of the shooting platform 13 is greatly different from that of the shooting platform 13 at the time of training a machine learning model, the background area of a recognition merchandise item image becomes significantly different from that of the learning merchandise item image, resulting in a decrease in the accuracy of the merchandise item recognition operation.

In this view, in the present embodiment, the merchandise item checkout device 1 captures an image of the shooting platform 13 without any merchandise item thereon with the merchandise item recognition camera 11 to acquire a background image for determination (current background image), and then compares the background image for determination with the background image for training, to thereby determine necessity of an update operation based on whether or not the background image for determination is different from the background image for training (update necessity determination operation). The background image for training is not limited to that used in the previous update, and may be any other image data such as an averaged image of the background images used in multiple updates in the past.

Specifically, the merchandise item checkout device 1 compares the background image for determination with the background image for training to determine whether or not the background image for determination includes changes from the background image for training to an amount beyond an acceptable level. The brightness of the shooting platform 13 may change entirely or partially depending on the conditions of sunlight and weather. Thus, the merchandise item checkout device 1 may acquire the brightness of each of the background images for determination and the background image for training, and determine the necessity of the update operation on the model based on whether or not there is a significant change in the brightness pattern (brightness distribution in an image). The determination may be made by using a background subtraction or segmentation method.

In the example shown in FIG. 3, the background image A for determination is similar to the merchandise item image for training, whereas, the background image B for determination is entirely darker than the merchandise item image for training and the background image C for determination is partially darker than the merchandise item image for training. In the case of the background image A for determination, the merchandise item checkout device 1 determines that the update operation is unnecessary. In the case of the background images B and C for determination, as the accuracy of the merchandise item recognition operation is reduced, the merchandise item checkout device 1 determines that the update operation is necessary.

When a merchandise item checkout device 1 is newly installed in a store, the merchandise item checkout device 1 preferably performs an update operation in response to an operator's instruction operation (such as pressing a predetermined button or entering a predetermined signal), without performing the update necessity determination operation.

Preferably, the merchandise item checkout device 1 periodically performs the update necessity determination operations at predetermined times. In other cases, the merchandise item checkout device 1 may perform the update necessity determination operation when a predetermined event occurs. For example, the merchandise item checkout device 1 may perform the update necessity determination operation when an administrator instructs the device to perform the update necessity determination operation.

The merchandise item checkout device 1 does not need to start the update operation immediately after determining that the update operation is necessary through the update necessity determination operation, but may start the update operation at the earliest appropriate time after the determination. More specifically, the update operation requires first acquires a captured image of the shooting platform 13 without any merchandise item thereon as a background image for training, but such a background image can be captured only when no merchandise item is placed on the shooting platform 13. During times when a store is crowded, a time period for which no merchandise item is placed on the shooting platform 13 can be very short, or it may be difficult to stop a checkout operation in order to perform an update operation.

Thus, it is preferable to start the update operation and acquire a background image when it is highly likely that no merchandise item is placed on the device, such as when the merchandise item checkout device 1 is turned on at the time of opening the store.

The merchandise item checkout device 1 may be configured such that the device notifies an administrator that an update operation (background shooting operation) is necessary, and when the administrator instructs the device to perform the update operation, the device starts the update operation and acquires a background image. In this configuration, as an administrator determines whether or not to perform the update operation, the merchandise item checkout device 1 can start the update operation even at a time when it is difficult for the device to automatically determine the necessity of the update operation, such as when the store is temporarily vacant.

The merchandise item checkout device 1 configured to detect an object placed on the shooting platform 13 from an image captured by the merchandise item recognition camera 11 and start an update operation, may be used to perform a background shooting operation when the object is not detected on the shooting platform 13. In this configuration, the merchandise item checkout device 1 can automatically determine that there is no merchandise item on the shooting platform 13, and start the update operation in response to such a determination. The merchandise item checkout device 1 may be configured to detect an object placed on the shooting platform 13 based on detection results of other sensors (such as weight sensor and 3D sensor) in addition to a captured image, and start an update operation when no object is detected. Detection results of other sensors are preferably used in addition to a captured image when a background image is likely to be different from that at the previous update to the extent which would make it difficult to accurately determine only from a captured image whether or not an object is placed on the shooting platform 13. For the same reason, the merchandise item checkout device 1 may be configured to detect that there is no object on the shooting platform 13 based on detection results of other sensors without using any captured image. When such other sensors are used, the detection accuracy of sensors may be lower than the accuracy of detection based on a captured image because the detection accuracy required to determine whether or not to perform an update operation only needs to be accurate enough to determine whether or not there is an object on the shooting platform 13 and there is no need to determine what types of objects and how many objects are there.

The merchandise item checkout device 1 may determine when to start the update operation based on information other than information acquired from the shooting platform 13. For example, when there is no person in front of the merchandise item checkout device 1, it is likely that there is no merchandise item on the shooting platform 13. Thus, the merchandise item checkout device 1 may be configured to perform a background shooting operation when there is no person in front of the device. In this case, the merchandise item checkout device 1 may be configured to detect the face of a person in front of the merchandise item checkout device 1 from an image captured by the face authentication camera 12, and determine that there is no person in front of the merchandise item checkout device 1 when detecting no person's face. Alternatively, the merchandise item checkout device 1 may detect a person in front of the merchandise item checkout device 1 from an image captured by a security camera installed in the store.

The merchandise item checkout device 1 may temporarily disable the merchandise item checkout device 1 while the update operation is being performed. This is because, when the update operation is performed, a current background image may be significantly different from that for the known model, which means that the merchandise item checkout device 1 cannot achieve accurate merchandise item recognition, and the load of processing for the update operation on the system may stop or delay a checkout operation. For the same reason, the update operation may be performed during a time of day in which there are few users.

Figure 4:
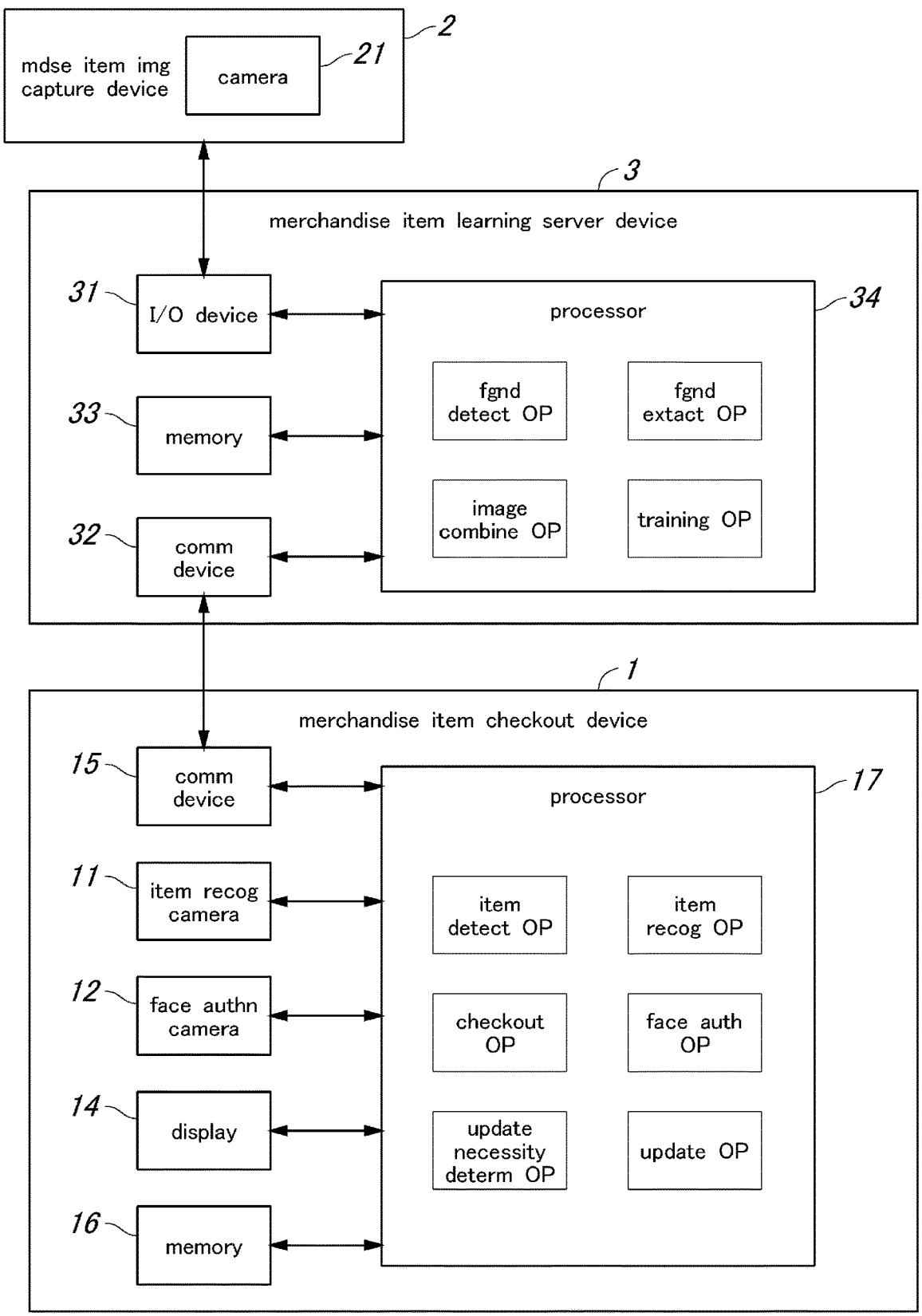
FIG. 4 is a block diagram showing schematic configurations of a merchandise item checkout device 1 and a merchandise item learning server device 3 according to the first embodiment.

Next, schematic configurations of a merchandise item checkout device 1 and a merchandise item learning server device 3 according to the first embodiment will be described. FIG. 4 is a block diagram showing schematic configurations of a merchandise item checkout device 1 and a merchandise item learning server device 3.

The merchandise item learning server device 3 includes an input/output device 31, a communication device 32, a memory 33, and a processor 34.

The input/output device 31 outputs and receives necessary data to and from the merchandise item image capturing device 2. Specifically, the input/output device 31 receives images captured by the camera 21 as inputs from the merchandise item image capturing device 2.

The communication device 32 communicates with the merchandise item checkout device 1. Specifically, the communication device 32 receives a background image for training transmitted from the merchandise item checkout device 1. The communication device 32 also transmits to the merchandise item checkout device 1 a training result generated by the processor 34; that is, trained model data (such as configuration parameters) related to a trained machine learning model for merchandise item recognition. As used herein, the term "processor" refers to not only a single processor but also to an integrated operating entity when a plurality of processors having the same purpose or a plurality of processors having different purposes (e.g., a general-purpose CPU (Central Processing Unit) and a GPU (Graphical Processing Unit)) jointly perform processing operations.

The memory 33 stores programs executable by the processor 34, and other data.

The processor 34 performs various processing operations related to information collection by executing programs stored in the memory 33. In the present embodiment, the processor 34 performs a foreground detection operation, a foreground extraction operation, an image combining operation, a training operation, and other processing operations.

In the foreground detection operation, the processor 34 discriminates a foreground area (a merchandise item area) from a background area in a merchandise item image to detect the foreground area (merchandise item area) from the merchandise item image.

In the foreground extraction operation, the processor 34 extracts an image of the foreground area (merchandise item area) based on a result of the foreground detection operation; that is, a mask image (an image representing the regions of a foreground area), to thereby acquire a backgroundless merchandise item image (merchandise item area image).

In the image combining operation, the processor 34 combines a background image for training acquired from the merchandise item checkout device 1 with a backgroundless merchandise item image stored in the memory, to thereby acquire a learning merchandise item image representing a merchandise item virtually placed on the shooting platform 13 of the merchandise item checkout device 1.

In the training operation, the processor 34 performs a training operation on the machine learning model for merchandise item recognition, using an merchandise item image for training as input training data and merchandise item identification information as output training data. As a result of the training operation, the processor 34 acquires trained model data (configuration parameters) related to the trained machine learning model. The trained model data acquired in the training operation is transmitted from the communication device 32 to the merchandise item checkout device 1.

The merchandise item checkout device 1 includes a merchandise item recognition camera 11, a face authentication camera 12, a display 14, a communication device 15, a memory 16, and a processor 17.

The merchandise item recognition camera 11 captures an image of a merchandise item placed on the shooting platform 13. An image captured by the merchandise item recognition camera 11 is used for recognizing the merchandise item (determining the name of the item) placed on the shooting platform 13.

The face authentication camera 12 captures the face of a person who performs a checkout-related operation in front of the checkout table. The captured image of the face authentication camera 12 is used for face authentication for payment.

The display 14 displays an image that allows a user to confirm whether or not there is an error in a merchandise item recognition result (name of the merchandise item to be checked out). When there is no error in the merchandise item recognition result, the user can perform an operation related to face authentication. When there is an error in the merchandise item recognition result, the user can perform an operation to correct the merchandise item identification to be checked out. As an example, the display 14 is a touch panel display in which a display panel and a touch panel are integrated into one device. The display panel and any other input device such as a touch panel or a keyboard may be provided in the forms of separate components.

The communication device 15 communicates with the merchandise item learning server device 3. Specifically, the communication device 15 transmits a captured image of the shooting platform 13 without any merchandise item thereon (background image for training) to the server at the time of training operation. Furthermore, the communication device 15 receives, from the server, trained model data (configuration parameters) related to a trained machine learning model for merchandise item recognition acquired in the training operation performed by the server.

The memory 16 stores programs to be executed by the processor 17 and other data.

The processor 17 performs various processing operations related to information collection by executing programs stored in the memory 16. In the present embodiment, the processor 17 performs a merchandise item detection operation, a merchandise item recognition operation, a checkout operation, a face authentication operation, an update necessity determination operation, an update operation, and other operations.

In the merchandise item detection operation, the processor 17 detects a merchandise item placed on the shooting platform 13 based on an image captured by the merchandise item recognition camera 11. In this operation, the processor 17 detects the position of the merchandise item, cuts out a rectangular image area surrounding each merchandise item from the captured image, and acquires a merchandise item area image. In the present embodiment, a machine learning model for merchandise item detection is used for the merchandise item detection operation, and the processor 17 inputs an image captured by the merchandise item recognition camera 11 into the machine learning model for merchandise item detection, and acquires a merchandise item detection result (such as the presence/absence of a merchandise item or the position of the merchandise item) output from the machine learning model for merchandise item detection.

In the merchandise item recognition operation, the processor 17 recognizes a merchandise item placed on the shooting platform 13 based on a merchandise item area image acquired in the merchandise item detection operation. In the present embodiment, a machine learning model for merchandise item recognition is used for the merchandise item recognition operation, and the processor 17 inputs a merchandise item area image into the machine learning model for merchandise item recognition, and acquires a merchandise item recognition result (such as merchandise item information) output from the machine learning model for merchandise item recognition.

When a plurality of merchandise items are placed on the shooting platform 13 of the merchandise item checkout device 1, the processor 17 can recognize the plurality of merchandise items at the same time. In this case, in the merchandise item detection operation, the processor 17 generates a merchandise item area image containing a single merchandise item for each of the merchandise items, and in the merchandise item recognition operation, the processor 17 recognizes each merchandise item based on a corresponding merchandise item area image.

In the checkout operation, the processor 17 checks out the merchandise item placed on the shooting platform 13 based on the merchandise item identification information acquired in the merchandise item recognition operation. That is, the processor 17 acquires the price (unit price) of each merchandise item placed on the shooting platform 13, and calculates the merchandise total based on the price and quantity of each merchandise item.

In the face authentication operation, the processor 17 detects the face of a person who is to purchase a merchandise item from an image captured by the camera 12 for face authentication (face detection), cuts out a face image from the image captured by the camera 12 for face authentication, and controls the communication device 15 so that it transmits a face authentication request including the face image to the face authentication server device 4.

In the update necessity determination operation, the processor 17 acquires a background image for determination (current background image) of the shooting platform 13 without any merchandise item thereon with the merchandise item recognition camera 11, and then compares the background image for determination with a learning merchandise item image (background image used for training) at the time of the previous update to thereby determine the necessity of an update operation based on whether or not the background image for determination is different from the background image for training to an amount beyond an acceptable level.

In the update operation, when determining that the update operation is necessary in the update necessity determination operation, the processor 17 controls the communication device 15 so that it transmit the current background image for training to the merchandise item learning server device 3. Then, when receiving trained model data (such as configuration parameters) related to trained machine learning model for merchandise item recognition from the merchandise item learning server device 3, the processor 17 reconstructs a machine learning model for merchandise item recognition based on the received trained model data.

The sunlight condition that can affect a background image; that is, the status of the shooting platform 13, changes depending on the time of day. Thus, the merchandise item checkout device 1 may be configured to store machine learning models for merchandise item recognition for different times of day (e.g., different models for morning, noon, and night) in the memory, and selects a machine learning model for the current time of day to perform the merchandise item recognition operation. Also, as the weather condition affects the sunlight condition, the merchandise item checkout device 1 may be configured to store machine learning models for merchandise item recognition for different weather conditions (such as sunny weather condition and cloudy weather condition) in the memory, and selects a machine learning model for the current weather condition to perform the merchandise item recognition operation. Furthermore, the merchandise item checkout device may be configured to store machine learning models for different combinations of the time of day and weather condition in the memory and selects a machine learning model for merchandise item recognition according to the current weather and current time of day to perform merchandise item recognition operation. Similarly, the merchandise item checkout device 1 may perform the update operation by selecting a machine learning model for merchandise item recognition for the current time of day and the current weather condition at the time of determining that the update operation is necessary.

Figure 5:
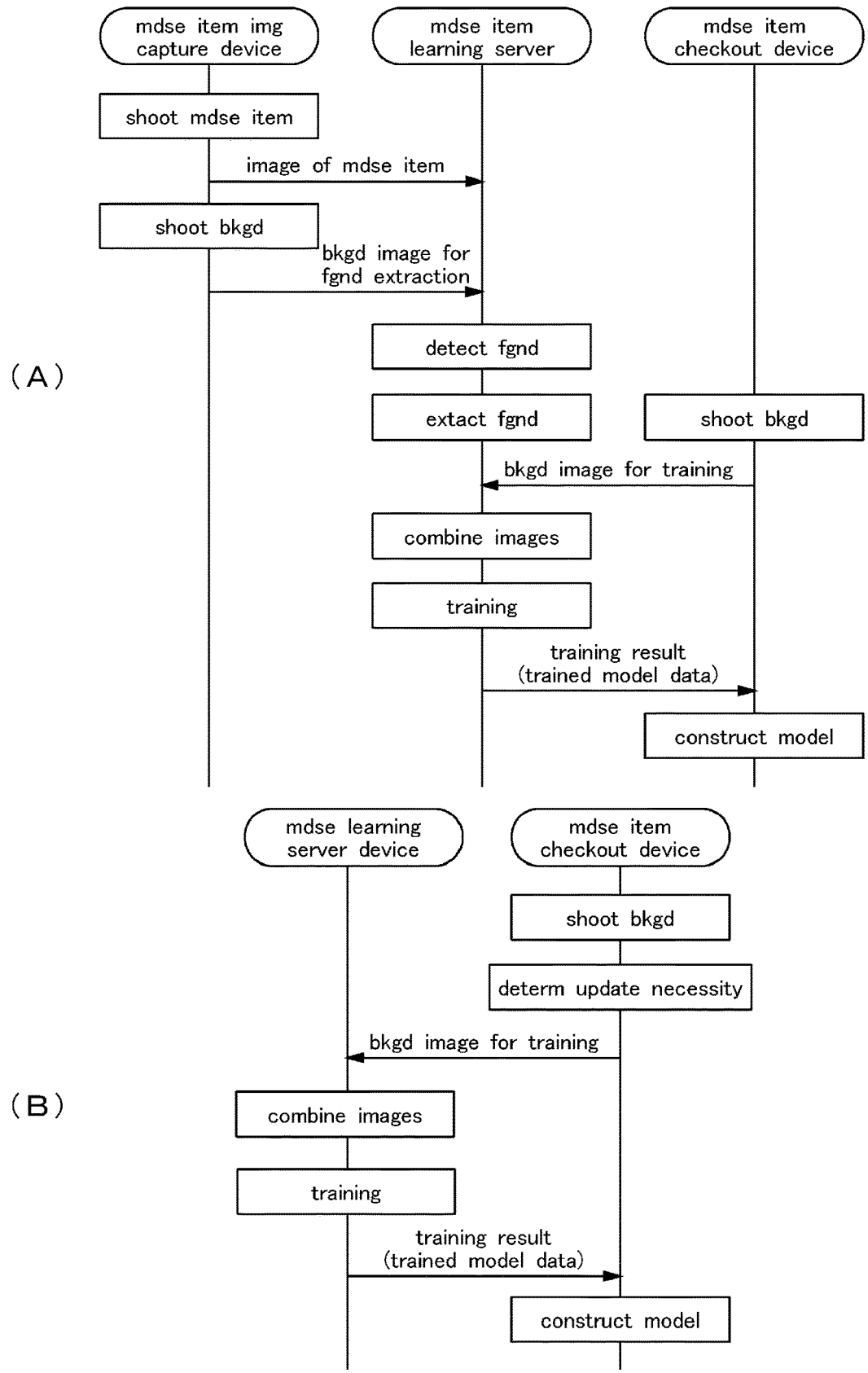
FIG. 5 is a sequence diagram showing operation procedures of a merchandise item checkout device 1, a merchandise item image capturing device 2, and a merchandise item learning server device 3 according to the first embodiment.

Next, operation procedures of a merchandise item checkout device 1, a merchandise item image capturing device 2, and a merchandise item learning server device 3 according to the first embodiment will be described. FIG. 5 is a sequence diagram showing operation procedures of a merchandise item checkout device 1, a merchandise item image capturing device 2, and a merchandise item learning server device 3.

First, referring to FIG. 5(A), operation procedures of the merchandise item checkout device 1, the merchandise item image capturing device 2, and the merchandise item learning server device 3 when a training operation is performed will be described.

When a training operation is performed, first, in the merchandise item image capturing device 2, the camera 21 captures an image of a merchandise item placed on the shooting platform 22 and acquires a merchandise item image (merchandise item shooting operation). Then, the merchandise item image capturing device 2 transmits the merchandise item image to the merchandise item learning server device 3. In the merchandise item checkout device 1, the merchandise item recognition camera 11 captures an image of the shooting platform 13 without any merchandise item thereon, and acquires a background image for foreground extraction (background shooting operation). Then, the communication device 15 transmits the background image for foreground extraction to the merchandise item learning server device 3.

Next, in the merchandise item learning server device 3, the processor 34 extracts a foreground area (image area of the merchandise item) from the merchandise item image and acquires the position of the foreground area (foreground detection operation). Next, the processor 34 extracts an image of the foreground area (merchandise item area) from the merchandise item image and acquires a backgroundless merchandise item image (foreground extraction operation).

Then, in the merchandise item checkout device 1, the merchandise item recognition camera 11 shoots the shooting platform 13 without any merchandise item thereon and acquires a background image for training (background shooting operation). Then, the communication device 15 transmits the background image for training to the merchandise item learning server device 3.

Next, in the merchandise item learning server device 3, the processor 34 combines the background image for training acquired from the merchandise item checkout device 1 with a backgroundless merchandise item image stored in the memory 33 to acquire a learning merchandise item image representing the merchandise item virtually placed on the shooting platform 13 of the checkout device 1 (image combining operation). Next, the processor 34 uses the learning merchandise item image as training data to perform a training operation on the machine learning model for merchandise item recognition. Then, the communication device 32 transmits a training result; that is, trained model data (configuration parameters) related to the trained machine learning model to the merchandise item checkout device 1.

Next, in the merchandise item checkout device 1, the processor 17 constructs a machine learning model for merchandise item recognition based on the trained model data (configuration parameters) related to the trained machine learning model for merchandise item recognition (model construction operation).

Next, referring to FIG. 5(B), operation procedures of the merchandise item checkout device 1, the merchandise item image capturing device 2, and the merchandise item learning server device 3 when an update operation is performed will be described.

When an update operation is performed, first, in the merchandise item checkout device 1, the merchandise item recognition camera 11 shoots the shooting platform 13 without any merchandise item thereon and acquires a background image for training (background shooting operation). Then, the processor 17 determines the necessity of an update operation on the machine learning model for merchandise item recognition depending on whether or not the current background image for training is different from the background image for training at the time of the previous update to an amount beyond an acceptable level (update necessity determination operation). When the processor 17 determines that the update operation is necessary, the communication device 15 transmits the current background image for training to the merchandise item learning server device 3.

Next, in the merchandise item learning server device 3, the processor 34 combines the background image for training acquired from the merchandise item checkout device 1 with a backgroundless merchandise item image stored in the memory 33 to acquire a learning merchandise item image (image combining operation). Next, the processor 34 uses the learning merchandise item image as training data to perform a training operation on the machine learning model for merchandise item recognition. Then, the communication device 32 transmits trained model data (configuration parameters) related to the trained machine learning model to the merchandise item checkout device 1.

Next, in the merchandise item checkout device 1, the processor 17 constructs a machine learning model for merchandise item recognition based on the trained model data (configuration parameters) related to the trained machine learning model for merchandise item recognition (model construction operation).

Second Embodiment

Figure 6:
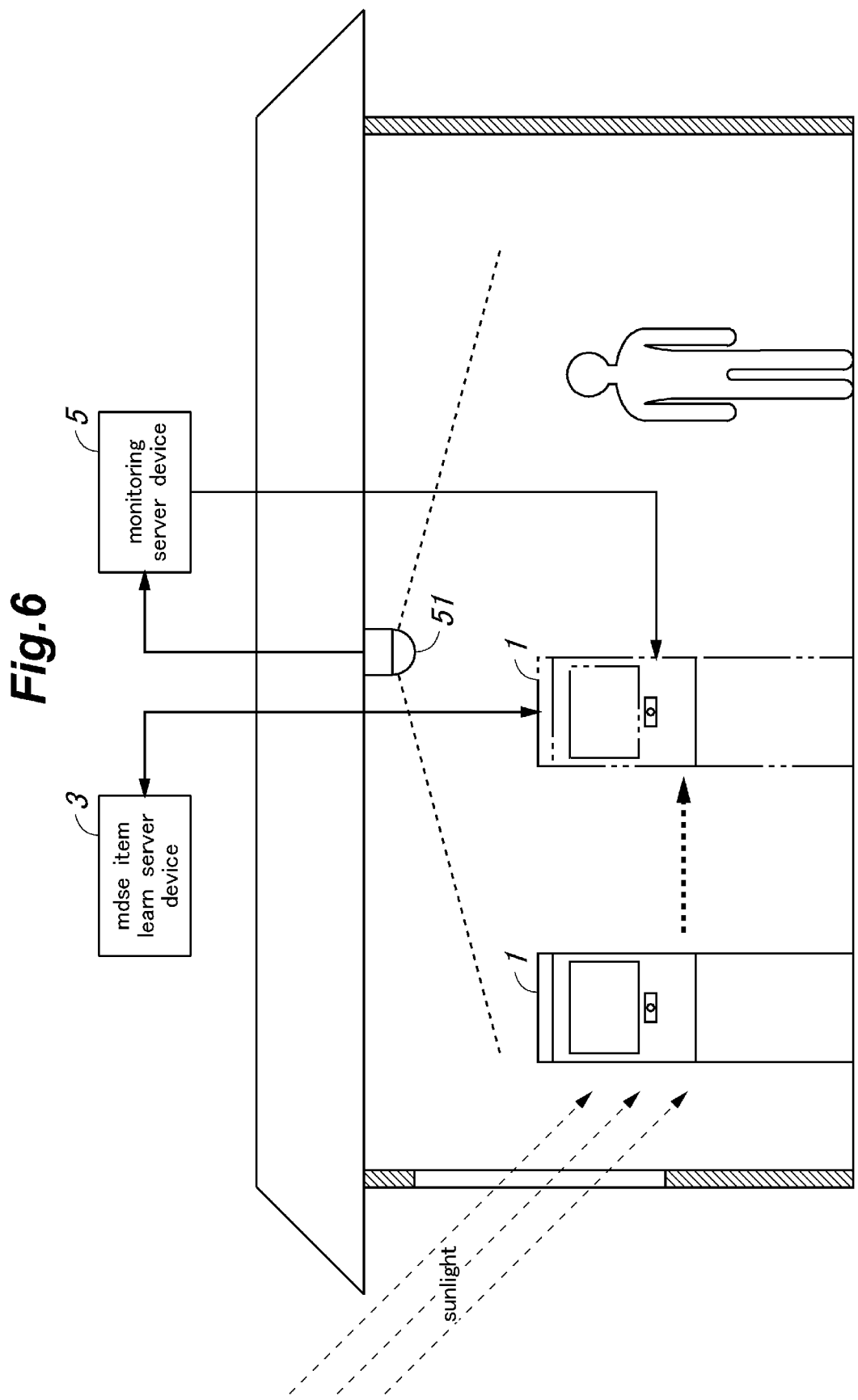
FIG. 6 is an explanatory diagram showing an outline of determination of necessity of an update operation performed by a merchandise item checkout system according to a second embodiment of the present disclosure.

Next, a second embodiment of the present disclosure will be described. Except for what will be discussed here, the second embodiment is the same as the above-described first embodiment. FIG. 6 is an explanatory diagram showing an outline of determination of necessity of an update operation performed by a merchandise item checkout system according to the second embodiment.

When the merchandise item checkout device 1 is moved to another location due to a change in the store layout, the brightness of the shooting platform 13 can significantly change from that at the time of training because the positional relationship between the shooting platform 13 of the checkout device 1 and the sunlight or lighting equipment greatly changes from those at the time of training.

Thus, in the update necessity determination operation of the present embodiment, the merchandise item checkout device 1 determines the necessity of the update operation based on whether or not the installation position of the merchandise item checkout device 1 has changed by a predetermined distance or more. Specifically, a security camera 51 installed in the store shoots the merchandise item checkout device 1. Then, a monitoring server device 5 detects the merchandise item checkout device 1 in an image captured by the security camera 51 through image recognition, measures the current position of the merchandise item check out device 1, and determines whether or not the installation position of the merchandise item checkout device 1 has changed from that at the previous update by a predetermined distance or more.

In the present embodiment, the merchandise item checkout device 1 performs the update necessity determination operation based on the change in the installation position of the merchandise item checkout device 1. However, the merchandise item checkout device 1 may determine the necessity of the update operation based on the change in the orientation of the merchandise item checkout device 1 in addition to the change in the installation position, because the change in the orientation of the merchandise item checkout device 1 can cause a significant change in the brightness of the shooting platform 13 due to a change in the positional relationship between the shooting platform 13 and the sunlight and lighting equipment.

In the present embodiment, when determining that an update operation is necessary based on the change in the installation position of the merchandise item checkout device 1, the merchandise item checkout device 1 automatically starts the update operation to perform a background shooting operation. However, in other embodiment, when detecting a change in the installation position of the merchandise item checkout device 1, the monitoring server device 5 may notify an administrator that an update operation (background shooting operation) is necessary, and ask the administrator whether or not to perform the update operation (background shooting operation), and the merchandise item checkout device 1 does not start the update operation until the administrator instructs the device to perform the update operation (background shooting operation).

Alternatively, the merchandise item checkout device 1 may be configured to start the update operation (background shooting operation) in response to an administrator's instruction to perform the operation, without detection of the change in the installation position of the merchandise item checkout device 1. Specifically, an administrator is notified in advance that, when a checkout table is moved, the administrator needs to instruct the device to perform an update operation, and the merchandise item checkout device 1 is configured to start the update operation in response to the administrator's instruction.

Variant of Second Embodiment

Figure 7:
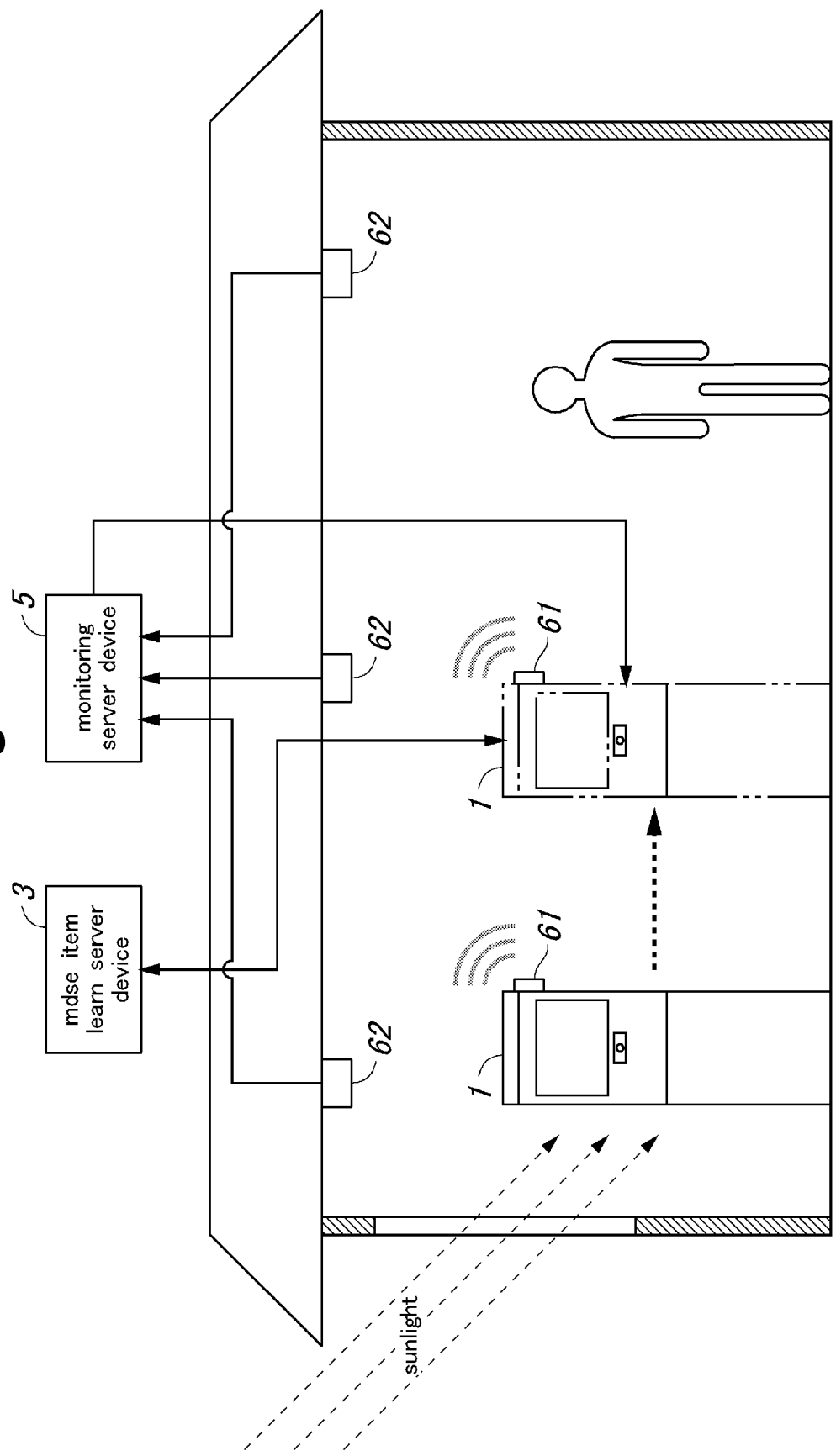
FIG. 7 is an explanatory diagram showing an outline of determination of necessity of an update operation performed by a merchandise item checkout system according to a variant of the second embodiment.

Next, a variant of the second embodiment will be described. Except for what will be discussed here, this embodiment is the same as the above-described second embodiment. FIG. 7 is an explanatory diagram showing an outline of determination of necessity of an update operation performed by a merchandise item checkout system according to the variant of the second embodiment.

In the second embodiment, the position or orientation of the merchandise item checkout device 1 is measured using an image captured by the security camera. In the variant of the second embodiment, the monitoring server device 5 measures the position or orientation of the merchandise item checkout device 1 using radio signals (such as radio signals of an RFID system (Radio Frequency Identifier system) and beacon signals).

Specifically, either a radio signal transmitter or a radio signal receiver is attached to the merchandise item checkout device 1, the other of the transmitter and receiver is installed at a predetermined position in the store, and the monitoring server device 5 measures the position of the merchandise item checkout device 1 based on the reception status of beacon signals at the receiver.

In the example shown in FIG. 7, an RFID tag 61 (transmitter) is attached to a merchandise item checkout device 1. A plurality of tag readers 62 (receivers) are installed at proper positions in the store. The monitoring server device 5 measures the position of a merchandise item checkout device 1 based on the reception status of a radio signal transmitted from the RFID tag 61 at the tag readers 62.

Third Embodiment

Next, a third embodiment of the present disclosure will be described. Except for what will be discussed here, the third embodiment is the same as the above-described embodiments. FIG. 8 is an explanatory diagram showing an outline of determination of necessity of an update operation performed by a merchandise item checkout system according to the third embodiment.

When the brightness of the shooting platform 13 of the merchandise item checkout device 1 changes significantly from the time of learning, the accuracy of merchandise item recognition decreases. For example, when there is a person who is to pay for a merchandise item in front of the merchandise item checkout device 1, the merchandise item is highly likely to be placed on the shooting platform 13. Thus, when no merchandise item is recognized although a person is in front of the checkout table (unrecognition state), or when a merchandise item is recognized although no person is in front of the checkout table (misrecognition state), the merchandise item recognition accuracy is likely to be reduced.

In this view, in the present embodiment, the merchandise item checkout device 1 determines the necessity of an update operation by detecting the decrease in the merchandise item recognition accuracy based on the occurrence of an unrecognition state or a misrecognition state.

Specifically, the merchandise item checkout device 1 detects a user who is to pay for a merchandise item in front of the merchandise item checkout device 1 (user detection), and also detects the merchandise item placed on the shooting platform 13 of the merchandise item checkout device 1. (merchandise item detection). When a result of the user detection is consistent with a result of the merchandise item detection; that is, the situation is normal, the merchandise item checkout device 1 determines that the update operation is unnecessary. When a result of user detection is not consistent with a result of merchandise item detection; that is, an unrecognition or misrecognition state occurs, and the detection frequency of unrecognition or misrecognition states (the number of occurrences of such states within a predetermined period) exceeds a predetermined threshold value, the merchandise item checkout device 1 determines that an update operation is necessary. In the case where the determination is based on the number of detection of unrecognition and misrecognition states, the merchandise item checkout device 1 may determine whether or not an update operation is necessary using information other than the detection frequency. For example, the merchandise item checkout device 1 may determine that an update operation is necessary when the cumulative number of times unrecognition and misrecognition states are detected exceeds a predetermined threshold value, or when the number of times of detection of the unrecognition states or the misrecognition states exceeds a predetermined threshold value.

When a user pays for a merchandise item, the user usually faces the merchandise item checkout device 1 and the face authentication camera 12 captures an image of the user's face from the front. Thus, the merchandise item checkout device 1 is preferably configured to detect the face of a user from an image captured by the face authentication camera 12 (face detection operation).

In the present embodiment, a user who pays for a merchandise item is detected based on an image captured by the face authentication camera 12. However, when face authentication is not performed, a camera may be configured to be used only for detection of a user's face. Alternatively, the merchandise item checkout device 1 may be configured to detect a person who pays for a merchandise item by using a sensor other than a camera, such as a motion sensor that can sense infrared rays, ultrasonic waves, or visible light.

Variant of Third Embodiment

Next, a variant of the third embodiment will be described. Except for what will be discussed here, the variant of the third embodiment is the same as the above-described third embodiment. FIG. 9 is an explanatory diagram showing an outline of determination of necessity of an update operation performed by a merchandise item checkout system according to the variant of the third embodiment.

When an error in a merchandise item recognition result (unrecognition state and misrecognition state) occurs due to the reduced accuracy of merchandise item recognition, a user performs an operation to correct a merchandise item(s) to be checked out (merchandise item correction operation). Thus, in the variant of the third embodiment, the merchandise item checkout device 1 is configured to acquire the frequency of detection of user's merchandise item correction operations (the number of occurrences of the operation within a predetermined period), and determines that an update operation is necessary when the frequency of detection exceeds a predetermined threshold value.

Specifically, when the merchandise item checkout device 1 does not detect a user's merchandise item correction operation; that is, the situation is normal, the device determines that the update operation is unnecessary. When the merchandise item checkout device 1 detects a user's merchandise item correction operation; that is, an unrecognition or misrecognition state occurs, and the frequency of detection of user's merchandise item correction operations exceeds a predetermined threshold value, the merchandise item checkout device 1 determines that an update operation is necessary. When detecting a user's merchandise item correction operation, the merchandise item checkout device 1 can recognize which state has occurred, an unrecognition state or a misrecognition state, and thus may perform different operations according to which state has occurred. For example, the merchandise item checkout device 1 may use different threshold values for an unrecognition state and a misrecognition state. In other cases in which the determination is made based on the number of user's correction operations, the merchandise item checkout device 1 may determine whether or not an update operation is necessary using information other than the frequency of detection. For example, the merchandise item checkout device 1 may determine that an update operation is necessary when the number of user's correction operations exceeds a predetermined threshold value.

In the present embodiment, the face authentication server device 4 performs face authentication. However, the merchandise item checkout device 1 may be configured to perform face authentication.

Next, a merchandise item checkout device 1 according to the variant of the third embodiment will be described. FIG. 10 is an explanatory diagram showing a screen displayed on a display 14 of a merchandise item checkout device 1 according to the variant of the third embodiment.

In the merchandise item checkout device 1, the display 14 displays a recognition result confirmation screen when a user is paying for a merchandise item to be purchased. The recognition result confirmation screen includes an image 71 captured by the merchandise item recognition camera 11, a merchandise item recognition result 72 (the name of recognized merchandise item), an approval button 73 for approving a merchandise item recognition result, and a correction button 74 for correcting a merchandise item recognition result.

When a merchandise item recognition result is correct, a user touches the approval button 73. When a merchandise item recognition result is not correct, a user touches the correction button 74. When the correction button 74 is operated, the display 14 displays a recognition result correction screen (not shown). A user can perform an operation to correct a merchandise item recognition result on the recognition result correction screen. Specifically, the user can enter a correct name of the merchandise item.

The example shown in FIG. 10(A) is a screen when a merchandise item recognition result is correct. The examples shown in FIGS. 10(B) and 10(C) are screens when a merchandise item recognition result is not correct. In particular, the example shown in FIG. 10(B) is a screen for an unrecognition state; that is, a state in which a merchandise item is placed on the shooting platform 13 but the merchandise item is not recognized. The example shown in FIG. 10(C) is a screen for a misrecognition state; that is, a state in which the merchandise item placed on the shooting platform 13 is recognized, but the merchandise item recognition result is not correct.

When a user performs an operation to correct a merchandise item recognition result, the merchandise item checkout device 1 stores information such as a time of the operation in the memory 16 as recognition result correction log information. The processor 17 calculates the frequency of detection of merchandise item correction operations (the number of occurrences of the operation within a predetermined period) based on the recognition result correction log information at a predetermined time. When the frequency of detection of merchandise item correction operations exceeds a predetermined threshold value, the processor 17 determines that an update is necessary.

Specific embodiments of the present disclosure are described herein for illustrative purposes. However, the present disclosure is not limited to those specific embodiments, and various changes, substitutions, additions, and omissions may be made for elements of the embodiments without departing from the scope of the present disclosure. In addition, elements and features of the different embodiments may be combined with each other to yield an embodiment which is within the scope of the present disclosure.

Other Embodiments

In the above-described embodiments, the merchandise item checkout device 1 installed in a store performs the merchandise item recognition operation. However, the merchandise item checkout device 1 and a server device connected to the network may cooperatively perform the merchandise item recognition operation. In this case, the merchandise item checkout device 1 transmits a captured image of a merchandise item to the server device, and then the server device inputs the captured image of the merchandise item received from the merchandise item checkout device 1 into a machine learning model for merchandise item recognition, acquires a merchandise item recognition result (merchandise item identification information), and transmits the merchandise item recognition result to the merchandise item checkout device 1. Since the merchandise item checkout devices 1 have different conditions for shooting a merchandise item, in the server device, a machine learning model for merchandise item recognition optimized for each merchandise item checkout device 1 may be constructed, and a merchandise item checkout device 1 may be configured to transmit the ID (such as device ID) of the merchandise item checkout device 1 together with the captured image of a merchandise item to the server device so that the server device can select a machine learning model for merchandise item recognition according to the merchandise item checkout device 1 based on the ID thereof to perform merchandise item recognition.

Configurations of devices of the merchandise item checkout system in each of the above-described embodiments are exemplary ones. In other embodiment, a merchandise item checkout system may be configured to provide only functions of components which are physically essential for each device placed at a store (e.g., cameras and shooting locations), and all the other functions are provided by different devices. For example, in the case of the update operation, the merchandise item checkout device 1 only performs acquisition and transmission of the minimum information (such as shooting and transmission of each background image), while the merchandise item learning server device 3 may perform all the other functions, including determination of whether or not to perform the update operation. In this case, the merchandise item checkout device 1 captures a background image for determination at a predetermined time and transmits the captured image to the merchandise item learning server device 3, and in response to a determination result from the merchandise item learning server device 3, the merchandise item checkout device 1 captures a background image for training. Since the merchandise item checkout devices 1 can have different conditions of shooting a merchandise item, when the merchandise item learning server device 3 performs all the operations other than what the merchandise item checkout device 1 performs, the merchandise item learning server device 3 preferably identifies the merchandise item checkout devices 1 for which the device 3 performs the operation, based on the ID (such as device ID) of the merchandise item checkout device 1. In the configuration, since each merchandise item checkout device 1 can be made simple, it becomes easy to provide merchandise item checkout devices 1 in a large number of stores or other places. Conversely, a merchandise item checkout device 1 may perform all the update related operations by itself. In this case, although the merchandise item checkout device 1 needs to have a high processing capacity, the device does not need to perform communications with external devices, which reduces the amount of communications. Allocation of functions provided by the respective devices may be changed depending on the processing capacities of the respective devices, the environment of the installation location of each device, the development of or change in the related technology, or other factors.

Although, in the above-described embodiments, an image of a shooting platform on which a merchandise item is placed is used as a background image, other background images may be used. For example, when the camera is configured to shoot a merchandise item from a side, an image of a wall or any other component provided at the back of the merchandise item may be acquired as a background image. In other words, a shooting location of the present disclosure is not limited to a shooting platform, and may be any object which can be shot as a background image when the camera shoots a merchandise item. However, as the above described embodiments in which an image including a background is used for merchandise item recognition, the constancy of the background image directly results in a decrease in the accuracy of merchandise item recognition. Thus, the recognition accuracy of a merchandise item checkout system can be more stable when a floor or wall surface configured as part of the merchandise item checkout device 1 is used as a background (shooting location), which enables a user to easily predict the cause of occurrence or magnitude of the change in the background.

The present disclosure can be embodied by software, hardware, or software linked to hardware. Each functional unit of the above-described embodiments may be partially or entirely implemented as an LSI, which is an integrated circuit, and each processing operation of the above-described embodiments may be partially or entirely controlled by a single LSI or a combination of LSIs. LSIs may be composed of separate chips, or may be composed of one chip including a part or all of functional units. An LSI may include data input and output. An LSI is referred to as an IC, a system LSI, a super LSI, and an ultra LSI depending on the degree of integration.

The type of an integrated processing component is not limited to an LSI, and may be implemented by a dedicated circuit, a general-purpose processor, or a dedicated processor. Such an LSI component may be an FPGA that can be programmed after production of the component, or a reconfigurable processor within which connections and settings of circuit cells can be reconfigured. The present disclosure may be embodied as digital processing operations or analog processing operations.

Furthermore, when advancement in semiconductor technology or formation of a different technology derived therefrom results in a new integrated circuit technology which can replace LSI technology, such a technology can also be used to implement functional units as an integrated processing component. For example, there is a possibility that biotechnology is applies to implementation of functional units of the present disclosure.

INDUSTRIAL APPLICABILITY

An object recognition device, an object recognition system, and an object recognition method according to the present disclosure makes it possible to perform accurate object recognition in a stable manner in consideration of changes in a shooting environment, and are useful as an object recognition device, an object recognition system, and an object recognition method for recognizing an object utilizing a machine learning model.

GLOSSARY

1 merchandise item checkout device
2 merchandise item image capturing device (object recognition device)
3 merchandise item learning server device (learning device)
4 face authentication server device
5 monitoring server device
11 merchandise item recognition camera
12 face authentication camera
13 shooting platform
17 processor
21 camera
22 image pickup platform
34 processor
51 security camera
61 RFID tag
62 tag reader

The invention claimed is:

1. An object recognition device comprising:
a camera configured to capture an image of a shooting location where an object is to be placed; and
a processor configured to recognize an object included in an image of the shooting location, utilizing a machine learning model for object recognition;
wherein the machine learning model for object recognition is constructed based on trained model data generated by a training operation using a composite image of a backgroundless object image and a background image for training acquired by capturing an image of the shooting location where no object is placed, and
wherein the processor is configured to:
determine necessity of an update operation on the machine learning model for object recognition at a predetermined time;
when determining that the update operation is necessary, cause the camera to capture an image of the shooting location where no object is placed to thereby re-acquire a background image for training; and
cause the machine learning model to be trained using a composite image of a backgroundless object image and the re-acquired background image for training as training data,
wherein the camera captures a current image of the shooting location where no object is placed, to thereby acquire a background image for determination, and
wherein the processor determines that the update operation is necessary when the background image for determination is different from the background image for training to an amount equal to or greater than a predetermined level.

2. The object recognition device according to claim 1, wherein machine learning models for object recognition are created for a plurality of times of day, and
wherein the processor determines which of the machine learning models for object recognition needs to be used in the update operation based on the time of day when the background image for determination is different from the background image for training to an amount equal to or greater than the predetermined level.

3. The object recognition device according to claim 1, wherein machine learning models for object recognition are created for a plurality of types of weather conditions, and
wherein the processor determines which of the machine learning models for object recognition needs to be used in the update operation based on the weather condition at a time when the background image for determination is different from the background image for training to an amount equal to or greater than the predetermined level.

4. The object recognition device according to claim 1, wherein the processor determines that the update operation is necessary when at least one of a current installation position and a current orientation of the object recognition device is different from that at the time of the training operation, to an amount equal to or greater than a predetermined level.

5. The object recognition device according to claim 1, wherein the processor determines that the update operation is necessary based on a number of times which inconsistency is detected between a result of detection of a user of the object recognition device and a result of detection of an object placed at the shooting location.

6. The object recognition device according to claim 5, wherein the processor determines that there is inconsistency between a result of detection of the user and a result of detection of the object when the user is not detected and the object is detected.

7. The object recognition device according to claim 5, wherein the processor determines that there is inconsistency between a result of detection of the user and a result of detection of the object when the user is detected and the object is not detected.

8. The object recognition device according to claim 1, wherein the processor determines that the update operation is necessary based on a number of times which a user operates to correct an error in a result of an object recognition operation.

9. The object recognition device according to claim 1, wherein the trained model data is generated by a learning device which holds the backgroundless object image,
wherein the object recognition device further comprises a communication device configured to transmit the background image for training to the learning device and receive the trained model data from the learning device, and
wherein, when the update operation is necessary, the processor causes the communication device to transmit the background image for training to the learning device, thereby causing the learning device to re-perform the training operation.

10. The object recognition device according to claim 1, wherein the object recognition device is a checkout device for checking out an object placed at the shooting location.

11. An object recognition system comprising a shooting location where an object is to be placed, and a camera for capturing an image of the shooting location and configured to recognize an object included in an image of the shooting location, utilizing a machine learning model for object recognition,
wherein the machine learning model for object recognition is constructed based on trained model data generated by a training operation using a composite image of a backgroundless object image and a background image for training acquired by capturing an image of the shooting location where no object is placed, and
wherein the object recognition system is configured to:
determine necessity of an update operation on the machine learning model for object recognition at a predetermined time;
when determining that the update operation is necessary, cause the camera to capture an image of the shooting location where no object is placed to thereby re-acquire a background image for training; and
cause the machine learning model to be trained using a composite image of a backgroundless object image and the re-acquired background image for training as training data,
wherein the camera captures a current image of the shooting location where no object is placed, to thereby acquire a background image for determination, and
wherein the object recognition system determines that the update operation is necessary when the background image for determination is different from the background image for training to an amount equal to or greater than a predetermined level.

12. An object recognition method comprising:
capturing an image of a shooting location where an object is to be placed with a camera; and
recognizing an object included in an image of the shooting location, utilizing a machine learning model for object recognition,
wherein the object recognition method further comprises:
determining necessity of an update operation on the machine learning model for object recognition at a predetermined time;
when the update operation is necessary, causing the camera to capture an image of the shooting location where no object is placed to thereby re-acquire a background image for training; and
causing the machine learning model to be trained using a composite image of a backgroundless object image and the re-acquired background image for training as training data,
wherein the camera captures a current image of the shooting location where no object is placed, to thereby acquire a background image for determination, and
wherein the update operation is determined to be necessary when the background image for determination is different from the background image for training to an amount equal to or greater than a predetermined level.

* * * * *